United States Patent
Papaix et al.

(10) Patent No.: US 10,186,157 B2
(45) Date of Patent: Jan. 22, 2019

(54) CENTER FOR ASSISTING THE FLIGHT MANAGEMENT OF A PLURALITY OF AIRCRAFT

(71) Applicant: Airbus Operations SAS, Toulouse (FR)

(72) Inventors: Benoit Papaix, Toulouse (FR); Thibaut Poux, Toulouse (FR); Benjamin Mazoin, L'Union (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/457,425

(22) Filed: Mar. 13, 2017

(65) Prior Publication Data

US 2017/0270804 A1    Sep. 21, 2017

(30) Foreign Application Priority Data

Mar. 15, 2016   (FR) ..................................... 16 52146

(51) Int. Cl.
   *G08G 5/00*   (2006.01)
   *H04L 29/08*  (2006.01)

(52) U.S. Cl.
   CPC ......... *G08G 5/0043* (2013.01); *G08G 5/0013* (2013.01); *G08G 5/0026* (2013.01); *G08G 5/0082* (2013.01); *H04L 67/12* (2013.01)

(58) Field of Classification Search
   CPC ...... G08G 5/00; G08G 5/0026; G08G 5/0043; H04L 67/12
   See application file for complete search history.

(56) References Cited

U.S. PATENT DOCUMENTS

| | | | |
|---|---|---|---|
| 5,659,475 A | * | 8/1997 | Brown ................. G08G 5/0026 701/120 |
| 5,941,929 A | | 8/1999 | Shiomi et al. |
| 6,020,831 A | | 2/2000 | Nishida et al. |
| | | | (Continued) |

FOREIGN PATENT DOCUMENTS

EP            2814019          12/2014

OTHER PUBLICATIONS

French Search Report, dated Nov. 9, 2016, priority document.

*Primary Examiner* — Aaron L Troost
(74) *Attorney, Agent, or Firm* — Greer, Burns & Crain, Ltd.

(57) ABSTRACT

A center to assist flight management of a plurality of an entity's aircraft comprising a control unit and at least two stations and communication equipment configured to receive data signals and to transmit/receive audio signals to/from each aircraft. The control unit comprises a man-machine interface connected to a central unit, the central unit being connected to a computation unit of each station and to the communication equipment to receive data signals and to transmit/receive audio signals to/from the equipment. Each station comprises, connected to the computation unit, a screen to display the data in the data signals sent by each aircraft and an audio device for the operator to exchange audio signals with the pilots. The central unit is configured to selectively activate/deactivate, as a function of the interactions of an operator with the interface, the exchanges of audio signals with the central unit of each station.

8 Claims, 3 Drawing Sheets

(56) References Cited

U.S. PATENT DOCUMENTS

| | | | | |
|---|---|---|---|---|
| 6,047,233 | A | * | 4/2000 | Salvatore, Jr. ............ G01S 7/22 701/120 |
| 6,385,513 | B1 | * | 5/2002 | Murray .............. H04B 7/18508 340/945 |
| 2012/0147030 | A1 | * | 6/2012 | Hankers .................. G01W 1/00 345/619 |
| 2012/0237028 | A1 | | 9/2012 | Khazan et al. |
| 2012/0303253 | A1 | | 11/2012 | Irfan et al. |
| 2014/0372018 | A1 | | 12/2014 | Srinivasan et al. |

* cited by examiner

CENTER FOR ASSISTING THE FLIGHT MANAGEMENT OF A PLURALITY OF AIRCRAFT

CROSS-REFERENCES TO RELATED APPLICATIONS

This application claims the benefit of the French patent application No. 1652146 filed on Mar. 15, 2016, the entire disclosures of which are incorporated herein by way of reference.

BACKGROUND OF THE INVENTION

The present invention relates to a center for assisting the flight management of each of the aircraft of a plurality of aircraft belonging to an entity, for example to an airline company.

The complexity of air operations has resulted in airline companies designing ground-based centers housing operators, called "dispatchers," for assisting the pilots of the aircraft in the preparation of their flight and in monitoring the execution of the latter.

A center on the ground is dedicated to assisting the flight management of a plurality of aircraft and comprises a station in communication with each aircraft of the plurality of aircraft. The station receives flight data from each of the aircraft and an operator of the station displays on a screen of the station a map displaying the position and the flight plan of each aircraft as well as flight data (fuel level, system statuses, etc.) of the aircraft. Provided with this information, and for each aircraft, the operator is able to find ways of optimizing the flight (flight plan, engine speed, altitude, . . . ) and to offer them to the pilots by radio.

When an aircraft experiences a failure necessitating a fast landing, the operator analyzes the situation with the flight data he has and gives priority to the management of that aircraft, for example to indicate to the pilots which is the optimum path for arriving at the airport closest to the position of the aircraft. The flight management of the other aircraft is not optimized during the time over which the operator is managing the priority.

SUMMARY OF THE INVENTION

The purpose of the invention is to overcome this disadvantage totally or partially and relates to an improvement of the existing centers in order to optimize the flight management assistance of the aircraft carried out by these centers.

For this purpose, the invention relates to a center for assisting the flight management of each aircraft of a plurality of aircraft belonging to an entity, the center comprising communication equipment configured for receiving data signals from each of the aircraft and for transmitting/receiving audio signals to/from each of the aircraft, as well as a database comprising cartographic data, the center comprising moreover a control unit and at least two stations, the control unit comprising a central unit and each station comprising a computation unit connected to the central unit, the control unit comprising a man-machine interface connected to the central unit, the central unit being connected to the communication equipment in order to receive data signals sent by each of the aircraft of the plurality of aircraft coming from the equipment and to transmit/receive audio signals to/from the equipment, and each station is dedicated to assisting the flight management of at least one aircraft of the plurality of aircraft and receives, from the control unit, data signals sent by each of the aircraft of the plurality of aircraft, each station comprising, connected to the computation unit of the station, a display screen and an audio device, the display screen being configured for displaying the data contained in the data signals sent by each aircraft to the center, the audio device making it possible for the operator to exchange audio signals, via the communication equipment, with the pilots of the aircraft in order to advise the pilots on a possible modification of the flight, the central unit being configured for selectively activating or deactivating, as a function of the interactions of an operator with the man-machine interface, the exchanges of audio signals between the central unit and the computation unit of each of the stations so that the operator can allocate assistance to the flight management of each of the aircraft of the plurality of aircraft to the various stations.

The center for assisting the flight management of a plurality of aircraft, according to the invention, allows an operator of the control unit to allocate the assistance to the flight management of the aircraft between the at least two stations of the center, as a function of the workload of the operators of the stations.

When a priority (for example a failure of a system or fatigue of a pilot) occurs in an aircraft, the other aircraft which the station has the responsibility are allocated by the operator of the control unit to at least one other station so that the station deals solely with the assistance of the aircraft exhibiting a priority for as long as the operator of the control unit considers necessary. During the time over which the flight management of the aircraft having a priority lasts, the other stations are able to assist the other aircraft with their flight management.

Other advantages and features of the invention will appear in the following detailed and non-limiting description.

BRIEF DESCRIPTION OF THE DRAWINGS

This description will be given with reference to the appended drawings among which.

DETAILED DESCRIPTION OF THE PREFERRED EMBODIMENTS

Figure 1:
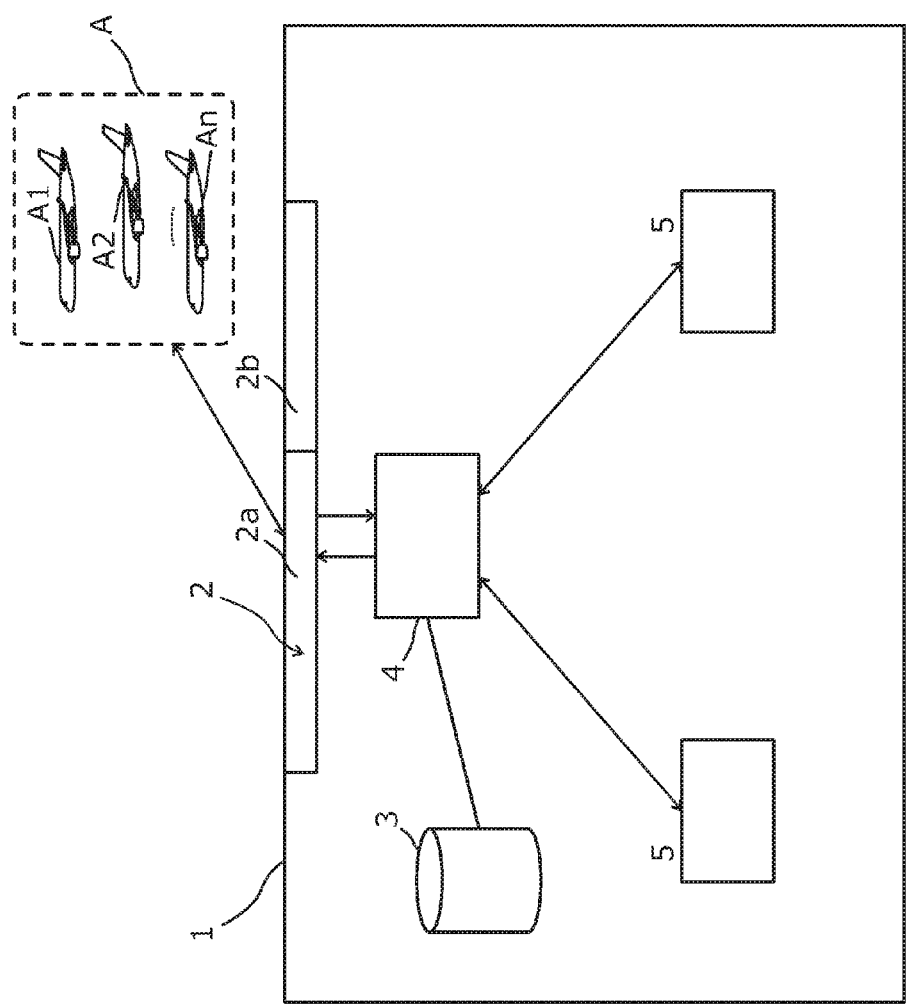
FIG. 1 is a block diagram of a center for assisting the flight management of a plurality of aircraft according to one embodiment of the invention, the center comprising equipment for communication with each one of the plurality of aircraft, two stations dedicated to assisting the flight management of the plurality of aircraft and a control unit at the interface between the communication equipment and the stations.

With reference to FIG. 1, a flight management assistance center 1 according to the invention is dedicated to assisting the flight management of a plurality of aircraft A belonging to an entity such as, for example, an airline company or a group of airline companies and allows operators based on the ground to display data related to the flight of each aircraft A1 . . . An of the plurality of aircraft A and to communicate with the pilots of each of the aircraft in order to help them optimize their flight as a function of the said data.

The center 1 comprises communication equipment 2 for receiving data signals from each of the aircraft A1 ... An of the plurality of aircraft A and for transmitting/receiving audio signals to/from each of the aircraft A1 ... An, a database 3 comprising cartographic data (geographic coordinates of the relief, of the airports, of no-fly zones, ... ) at least two stations 5 where each station is dedicated to assisting the flight management of at least one aircraft A1 ... An of the plurality of aircraft A, and a control unit 4 connected to the communication equipment 2, to the database 3 and to each of the stations 5 and via which an operator can allocate the flight management of the aircraft A1 ... An of the plurality of aircraft to the different stations.

According to the invention, the control unit 4 acts as a router for the audio signals exchanged between each station 5 and the aircraft A1 ... An via the communication equipment 2 in the sense that each station 5 can only exchange audio signals with aircraft A1 ... An for which the control unit 4 has allocated the flight management to the station 5. The data of the database 3 and the flight data contained in the data signals received via the communication equipment 2 are, on the other hand, permanently accessible to each of the stations 5.

It will be noted that according to the illustration shown in FIG. 1, the control center comprises two stations 5 and all of the components of the center 1 (communication equipment, database, control unit, stations) are contained in the same building. As a variant, which is not shown, the components of the center are distributed in different buildings and the center 1 comprises a number of stations greater than 2.

The communication equipment 2 comprise a receiver 2a of data signals, for example data signals of the VHF, HF or satellite (SATCOM) type and a transmitter/receiver 2b of audio signals, for example of audio signals of the VHF, HF or satellite (SATCOM) type.

The data carried by the data signals transmitted by each of the aircraft A1 ... An of the plurality of aircraft A to the center 1 comprise, as a minimum, the geographic coordinates of the points of the current flight plan of the aircraft, called flight plan in the rest of the description for purposes of conciseness, provided by the navigation equipment of the aircraft such as the FMS (standing for "Flight Management System"), and the geographic position of the aircraft measured by the sensors installed in the aircraft such as satellite positioning equipment of the GPS or GLONASS type. Each aircraft A1 ... An preferably transmits a data signal to the center 1 every two minutes in a nominal situation, and less than two minutes in the case of audio communication and/or of ongoing failure on the aircraft in order to update the data received by the center 1.

Preferably, the data carried by the data signals furthermore comprise flight parameters of the aircraft A1 ... An, provided by the sensors installed in the aircraft, such as the air and ground speed of the aircraft, the altitude, the engine speed, the status of the onboard systems, the diagnostics of possible failures and the associated procedures. The data furthermore advantageously comprise data on the status (physical status rest time) of the pilots provided by sensors worn by the pilots or installed in the cockpit of the aircraft A1 ... An.

Figure 2:
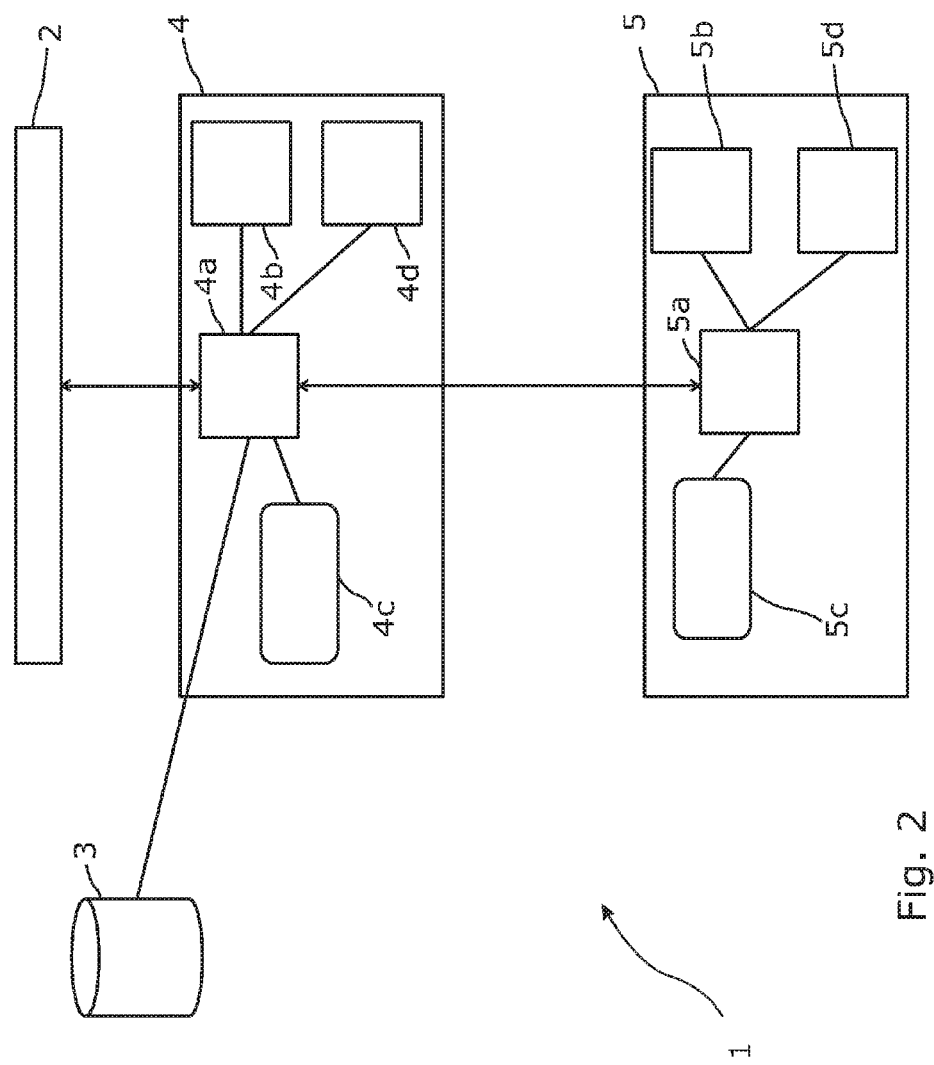
FIG. 2 is a block diagram showing in detail the control unit connected to a station of FIG. 1, the control unit and the station each comprising a display screen, a man-machine interface and an audio device.

With reference to FIG. 2, the control unit 4 comprises a central unit 4a (i.e. computer housing containing the mother board, the processor, the random access memory, the power supply, the storage peripherals) connected to the communication equipment 2 and to each station 5. The control unit 4 comprises moreover, connected to the central unit 4a, a man-machine interface 4b (for example: keyboard and mouse), a display screen 4c (the man-machine interface being able to be combined with the screen if the screen is a touch screen) and an audio device 4d (for example, an audio headset provided with a microphone) via which an operator of the control unit can transmit or receive an audio signal to/from an aircraft A1 ... An or a station 5. The central unit 4a uses management software upon which an operator acts via the man-machine interface 4b in order to allocate/ deallocate aircraft (i.e., the flight management assistance) to/from the stations 5 of the center 1. The distribution of the aircraft between the stations can be displayed on the screen 4c via an appropriate graphic interface used by the central unit 4a.

The central unit 4a uses moreover software which, when executed, displays on the screen 4c, the flight plan and the position of the aircraft A1 ... An of the plurality of aircraft A by superimposition on a map resulting from the processing of the cartographic data of the database 3 by the central unit 4a, as well as possibly other data received from the aircraft, such as, for example, the flight parameters of the aircraft. The man-machine interface 4b allows an operator of the control unit 4 to act on the central unit 4a in order to modify the display of the data on the screen 4c. It should be noted that the control unit 4 receives the signals (audio or data) from all of the aircraft A1 ... An of the plurality of aircraft A so that the operator of the control unit 4 can display on his screen 4c the data received from each of the aircraft A1 ... An of the plurality of aircraft A and assist the aircraft in the management of their flights.

Each station 5 comprises a computation unit 5a (i.e., computer housing containing the mother board, the processor, the random access memory, the power supply, the storage peripherals) connected to the central unit 4a of the control unit. Moreover, connected to the computation unit 5a, a station comprises an audio device 5d (for example an audio headset provided with a microphone), a man-machine interface 5b (for example: keyboard and mouse) as well as a display screen 5c (it being possible for the man-machine interface to be combined with the screen if the screen is a touch screen). The computation unit 5a uses software which, when executed, displays on the screen 5c the flight plan and the position of the aircraft A1 ... An allocated to the station in superimposition on a map resulting from the processing of the cartographic data of the database 3 by the computation unit 5a, as well as possibly other data received from the aircraft, such as, for example, the flight parameters of the aircraft. The man-machine interface 5b allows an operator of the station to act with the computation unit 5a in order to modify the display of the data on the screen 5c. For example, an operator can choose to display, on the screen 5c, the flight plan and the position of an aircraft A1 ... An superimposed on the map and, in a corner of the screen 5c, a window also superimposed on the map in which are displayed the diagnostics of systems installed in the aircraft.

It should be noted that the operator of a station 5 can communicate with the operator of the control unit 4 either by voice, when the station 5 and the control unit 4 are in the same building, or via an audio channel connecting the audio device 5d of the station 5 and the audio device 4d of the control unit 4.

As mentioned before, the central unit 4a of the control unit is connected to the communication equipment 2, in order to receive data signals coming from the latter and to transmit/receive audio signals to/from the latter, and is connected to the computation unit 5a of each station 5 in order to transmit data signals coming from the communication equipment 2 and to transmit audio signals between each station 5 and the communication equipment 2. When the operator of the control unit 4 allocates an aircraft to a station 5, the central unit 4a, via for example an electronic communication system used by the central unit 4a, activates a link with the computation unit 5a of the station 5 so that an operator of the station 5 can send or transmit audio signals to the aircraft. On the contrary, when the operator of the control unit 4 deallocates an aircraft from a station, the central unit 4a of the control unit, via the electronic communication system, deactivates a link with the computation unit 5a of the station 5 so that the operator can no longer send or transmit audio signals to the aircraft A1 . . . An.

Each operator of a station 5 has access to multiple data from the aircraft A1 . . . An for which the control unit 4 has allocated the management of the flight plan to the station 5. The operator of the station 5 can, via the audio device 5d, advise the pilots of these aircraft of possible modifications of their flight plan in order to optimize, for example, their flight pan, their flight time or their fuel consumption.

When a priority (for example a failure of a system or fatigue of a pilot) occurs in an aircraft A1 . . . An, the operator of the station 5 warns the operator of the control unit 4 of the occurrence of this priority (or the operator of the control unit 4 can himself become aware of the appearance of this priority via the information displayed on his screen 4c). In these cases, the operator of the control unit 5 allocates the other aircraft A1 . . . An for which the station has responsibility for fight management assistance to at least one other station 5 so that the operator of the station assists solely the pilots of the aircraft A1 . . . An exhibiting a priority, and does so for as long as the operator of the control unit 4 considers necessary.

During the time that the flight management assistance of the aircraft A1 . . . An exhibiting a priority lasts, the other stations 5 are capable of assisting the other aircraft A1 . . . An.

Thus, thanks to the invention, the workload is distributed between the stations 5 and the flight management of the aircraft A1 . . . An benefits from continuous ground assistance.

In a preferred embodiment of the invention, the stations 5 of the center 1 are grouped in pairs where each pair is dedicated to a particular geographic zone (Asia, Africa, Europe, Pacific). The operator of the control unit 4 allocates the aircraft flying in a geographic zone to the pair dedicated to that zone. Each pair of stations 5 can assist the flight management of five, or even of ten aircraft.

Figure 3:
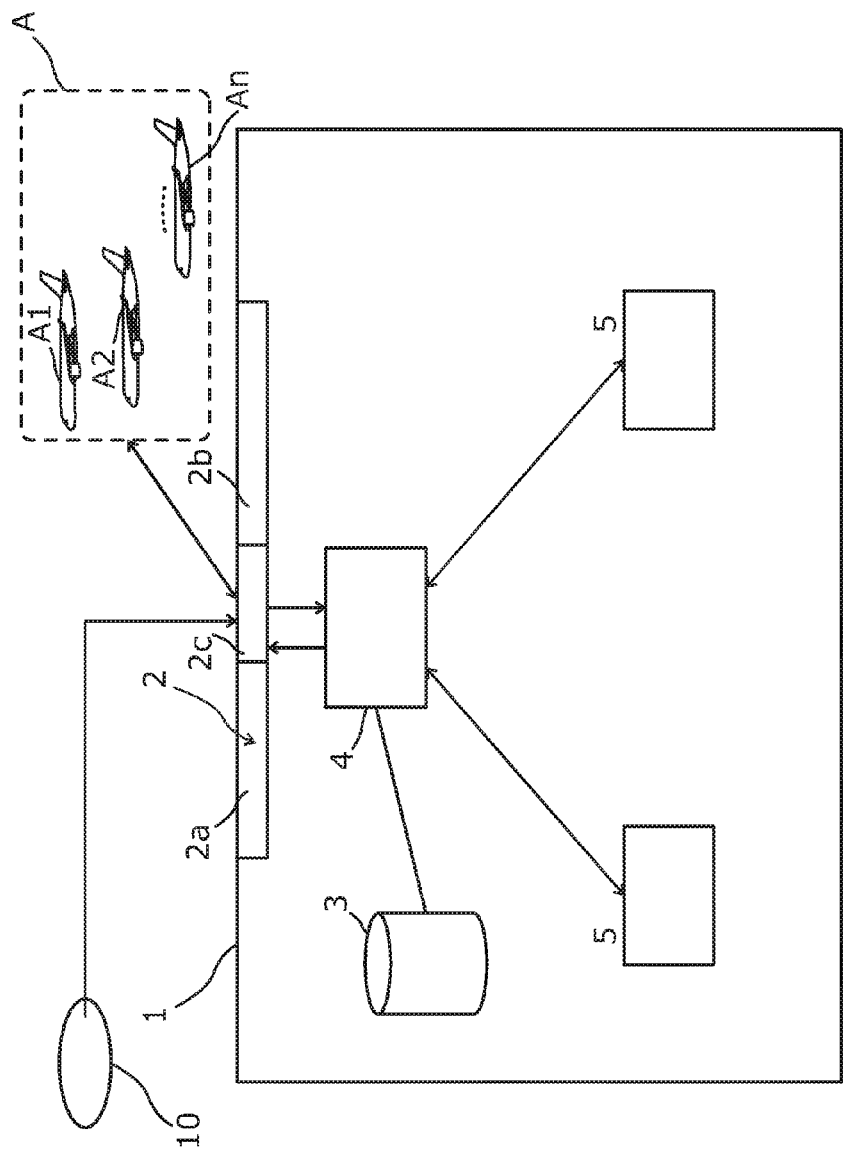
FIG. 3 is a block diagram similar to that of FIG. 1 showing a center according to an embodiment of the invention in which the communication equipment of the center are connected to a meteorological station.

In a second embodiment of the invention shown in FIG. 3, the communication equipment 2 of the center 1 comprise a receiver 2c for receiving data from at least one provider of aeronautical services 10, such as for example a meteorological station. The data coming from the meteorological station 10 comprise, for example, geographic coordinates of current or forecast meteorological phenomena (storm, . . . ) able to have an effect on the performance of the aircraft for which the center 1 is responsible for assisting the management of the flight plans.

The receiver 2c is, for example, an Internet network terminal equipment when the center is connected to the meteorological station 10 via the Internet.

The computation unit 5a of each station 5 combines the data from the meteorological station 10 with the cartographic data in the database 3 and controls the display screen 5c of the station 5 so that the latter displays the meteorological data on the map obtained by processing the cartographic data of the database 3 by the computation unit 5a.

According to this embodiment, the operator of the station 5 can provide, to an aircraft A1 . . . An, advice on the optimizing of the flight as a function of the future meteorological conditions which the pilots of the aircraft may not have been able to take into account because of the limited range of the meteorological radars installed in the aircraft.

Alternatively, the aeronautical services provider is, for example, a control station of an airport providing the state of congestion of the approach to the airport as well as the runways in service for the landing. In this case, the computation unit 5a of each station 5 is configured for displaying the data coming from the aeronautical services providers on the display screen 5c.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A center for assisting the flight management of each aircraft of a plurality of aircraft belonging to an entity, the center comprising:
   communication equipment configured to receive data signals from each of the aircraft and to transmit/receive audio signals to/from each of the aircraft, as well as a database comprising cartographic data,
   a control unit, and
   at least two stations,
      the control unit comprising a central unit and
      each station comprising a computation unit connected to the central unit,
      the control unit comprising a man-machine interface connected to the central unit, the central unit being connected to the communication equipment to receive data signals sent by each of the aircraft of the plurality of aircraft coming from the equipment and to transmit/receive audio signals to/from the equipment, and
      each station being dedicated to assisting the flight management of at least one aircraft of the plurality of aircraft and receiving, from the control unit, data signals sent by each of the aircraft of the plurality of aircraft,
      each station comprising, connected to the computation unit of the station, a display screen and an audio device, the display screen being configured to display the data contained in the data signals sent by each aircraft to the center, the audio device making it possible for the operator to exchange audio signals, via the communication equipment, with the pilots of the aircraft in order to advise the pilots on a possible modification of the flight of the aircraft,
      the central unit being configured to selectively activate and deactivate, as a function of the interactions of an operator with the man-machine interface, the exchanges of audio signals between the central unit and the computation unit of each of the stations so that the operator can allocate assistance to the flight management of each of the aircraft of the plurality of aircraft to the various stations.

2. The center according to claim 1, wherein the data contained in the data signals sent by each of the aircraft of the plurality of aircraft to the center comprise the geographic coordinates of the points of the current flight plan of the aircraft, and the position of the aircraft, the computation unit of each station being configured for displaying on the display screen the points of the current flight plan and the geographic position of the aircraft superimposed on a map obtained by a processing of the cartographic data of the database by the computation unit.

3. The center according to claim 1, wherein the data contained in the data signals sent by each of the aircraft of the plurality of aircraft to the center comprise the flight parameters of the aircraft, the status of the onboard systems, the diagnostics of possible failures and the associated procedures.

4. The center according to claim 1, wherein the data contained in the data signals sent by each of the aircraft of the plurality of aircraft to the center comprise data on the status of the pilots of the aircraft.

5. The center according to claim 1, wherein the communication equipment comprises a receiver configured to receive data from at least one aeronautical services provider, the computation unit of each station being configured to display the data coming from the aeronautical services provider on the display screen.

6. The center according to claim 1, wherein the communication equipment comprises a receiver configured to receive data from a meteorological station, the data comprising the geographic position of meteorological phenomena, the computation unit of each station being configured for displaying on the display screen the meteorological phenomena on the map obtained by a processing of the cartographic data of the database by the computation unit.

7. The center according to claim 1, wherein the communication equipment comprises a data signals receiver of the VHF, HF or satellite type and an audio signals transmitter/receiver of the VHF, HF or satellite type.

8. The center according to claim 1, wherein the central unit is configured to selectively activate and deactivate only the exchanges of audio signals between the central unit and the computation unit of each of the stations, wherein during said selective activation and said deactivation, said data contained in the data signals sent by each aircraft to the center and said cartographic data of said database remains accessible to each of the stations.

* * * * *